Patented June 5, 1945

2,377,653

UNITED STATES PATENT OFFICE 2,377,653

MANUFACTURE OF d-PSICOSE

Louis Sattler, New York, N. Y., assignor to The New York Sugar Trade Laboratory, Inc., New York, N. Y., a corporation of New York No Drawing. Application July 15, 1941, Serial No. 402,565

3 Claims. (Cl. 195—12)

The invention relates to the manufacture of d-psicose which is a sugar useful for making ribose used in the manufacture of vitamin G. Its production heretofore has been by way of synthesis from ribose itself otherwise produced, and has been extremely costly. I have found that this sugar can be prepared by a direct and simpler method and from inexpensive starting materials and at only a fraction of the former cost.

Examples of my process are as follows:

*Example 1.*—Molasses such as cane sugar molasses was subjected to alcoholic fermentation as by the use of yeast, and the fermentation was continued until the development of alcohol had substantially ceased. The alcohol distilled off was retained for further use, and the remaining liquid was separated from its nitrogenous matter, proteins, etc. by treatment with neutral lead acetate, which precipitated these substances. After filtering, the filtrate was cleared of lead, as by bubbling hydrogen sulphide into it, and the precipitate thus formed removed. The liquid, being then free of lead was first buffered against the development of acidity by the introduction of a small amount of barium carbonate and was then vacuum-concentrated at about 50° C. to the consistency of a thick syrup which syrup was thereupon deprived of all contained water, as by diluting it in ten to fifteen times its volume of alcohol with some benzene added, and then again concentrating it to syrup under the same conditions of temperature and vacuum. The syrup was then diluted with about fifteen times its volume of 98% ethyl alcohol and warmed to a temperature of about 45° C. (not to exceed 50°) in which condition such solids as had been formed in it from the preceding steps were filtered out of it, and it was again and finally concentrated to syrup consistency and held in a water bath, kept at 40° C.–50° C.

This syrup was next treated with a reagent calculated to change d-psicose to the form of a water insoluble derivative for which purpose phenylhydrazine hydrochloride was used. Four parts by weight of this reagent were heated with 2 parts distilled off and the risidue was taken up in ether sodium acetate in water solution. The precipitate which formed in this treatment was found to be the crude osazone of d-psicose which has the following formula:

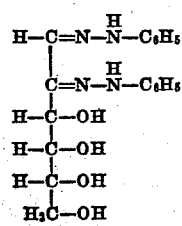

This, if desired, can be regarded as the final product to be sold as such, being a usable form of d-psicose. Its conversion to d-psicose can be accomplished by first reducing it, as for example, by use of zinc and acetic acid, as will be understood, thereby converting it to the osamine of d-psicose having the following formula:

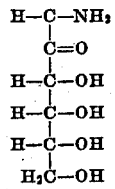

On treatment with nitrous acid the amino group in this osamine is substituted by hydroxyl yielding d-psicose, which has the formula:

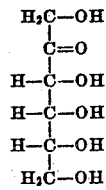

*Example 2.*—The fermentation liquid remaining after the removal of alcohol, was spray-dried to a powder. Some barium carbonate was added to prevent the development of any acidity, and the powder was worked up into a thin paste with ethyl alcohol at room temperature and stirred for two hours at a temperature of about 40° C. and then filtered. The filtrate was vacuum concentrated at about 45° C. to a thick syrup to remove all water and alcohol.

This syrup was next treated with a reagent adapted to change d-psicose to a physically differentiable form which reagent in this case was acetone. To a quantity of syrup there were added thirty times its volume of absolute acetone and three to four times its weight of powdered anhydrous copper sulphate with about 1/20 of its weight of concentrated sulphuric acid, to serve as dehydrating and catalytic agents. This mixture was stirred or shaken constantly for 48 hours and filtered.

To the filtrate sufficient potassium carbonate was added to neutralize all acid materials in the mixture, and such carbonate was then removed by filtration. The unreacted acetone was then distilled off and the residue was taken up in either and to this ether solution was added some strong potassium carbonate solution in order to make sure that the last trace of acid had been removed.

Water was eliminated from this ether extract by means of a standard drying agent, such as anhydrous sodium sulphate, and after the ether had been removed by distillation there remained an oil which contained a di-acetone derivative of d-psicose, having the following formula:

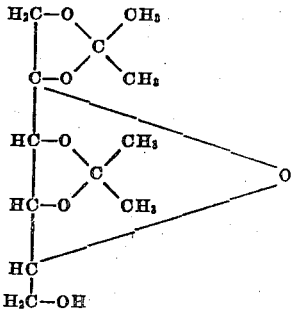

By fractional vacuum distillation of this oil, said derivative was separated from the other products.

Its boiling point range is between 105° and 120° C. at 0.4 mm.

Heating this fractional product with ten times its weight of 10% acetic acid for about half an hour caused the formation of d-psicose from the di-acetone derivative above referred to. Final treatment involved the removal of remaining traces of acetic acid by the use of soda-lime, and potassium hydroxide. The remaining thick syrup is d-psicose.

*Example 3.*—The alcoholic extract such as obtained by filtering the paste referred to in Example 2, was heated in vacuo at a temperature of about 45° C. to remove the alcohol. The concentrate was dissolved in water and was treated with enough neutral lead acetate solution to eliminate non-sugars as precipitate. After the solution had been cleared of lead as by the addition of hydrogen sulphide, the solution was treated in this case with phenyl hydrazine. A mixture of 12 grams of phenyl hydrazine in 10 ml. of water was combined with an equal volume of the syrup concentrate as above prepared. The mixture was stirred and kept in a water bath at 90° C., for eight hours, with occasional stirring. The mixture was then poured into ten times its volume of cold water and after standing 24 hours, the precipitate was removed and found to contain the osazone of d-psicose. This was purified by extraction with boiling water, in which it is soluble, and from which it crystallized on cooling to bright yellow crystals which were ready for use as the final product or for conversion into d-psicose, as before.

It is pointed out in general, that according to this invention the separated unfermentable sugary residuum of the fermentation of molasses, after appropriate purification and concentration, is treated with a reagent selected for its ability to change d-psicose to a derivative capable of physical differentiation so as to be separable either as precipitate or otherwise from its associated substances, d-psicose itself being freely soluble in alcohol and hot water. Of the reagents competent to effect this change members of the (phenyl) hydrazine group, also acetone are preferred though no limitation thereto is intended, since any reagent having a specificity of reaction with the functional atomic groups of d-psicose will suffice; nor is any limitation intended as to the source of the molasses nor the manner of conducting the fermentation nor the manner of concentration and water elimination of the syrups since these are matters of obvious detail. It is however of some importance that an acid condition be continuously avoided and that prior to conversion water be completely removed, since by its thorough removal unwanted water-soluble substances are rendered filtrable in the final alcoholic extract and are thereby kept from contaminating the psicose prior to the formation of a suitable derivative, allowing for its extraction in the manner stated.

I claim:

1. The process of producing d-psicose which comprises fermenting molasses by yeast to produce alcohol, concentrating the unfermentable residue, and recovering the d-psicose which is formed by treating the concentrate with a chemical reagent which converts the d-psicose to a derivative form which is isolatable by reason of having physical properties different from the contaminants, and isolating the derivative form of d-psicose.

2. The process of producing d-psicose which comprises fermenting molasses by yeast to produce alcohol, concentrating the unfermentable residue, and recovering the d-psicose which is formed by treating the concentrate with phenyl-hydrazine hydrochloride to convert the d-psicose to an osazone which is isolatable from the contaminants by reason of its different physical properties, isolating the osazone of d-psicose and thereafter treating the isolated osazone of d-psicose first with zinc and acetic acid and thereafter with nitrous acid to convert it to d-psicose.

3. The process of producing d-psicose which comprises fermenting molasses by yeast to produce alcohol, concentrating the unfermentable residue, and recovering the d-psicose which is formed by treating the concentrate with acetone to convert the d-psicose to a di-acetone derivative of d-psicose which is isolatable from the contaminants by reason of its different physical properties, isolating the di-acetone derivative of d-psicose and thereafter treating the isolated di-acetone derivative of d-psicose with acetic acid to convert it to d-psicose.

LOUIS SATTLER.

CERTIFICATE OF CORRECTION.

Patent No. 2,377,653.  June 5, 1945.

LOUIS SATTLER.

It is hereby certified that error appears in the printed specification of the above numbered patent requiring correction as follows: Page 1, first column, line 46, strike out the words "distilled off and the risidue was taken up in ether" and insert instead --of the syrup and 6 parts by weight of crystallized--; and that the said Letters Patent should be read with this correction therein that the same may conform to the record of the case in the Patent Office.

Signed and sealed this 18th day of September, A. D. 1945.

Leslie Frazer (Seal)  First Assistant Commissioner of Patents.